United States Patent [19]

Cleveland

[11] Patent Number: 4,949,197
[45] Date of Patent: Aug. 14, 1990

[54] DEAD TRACK ACQUISITION FOR PHASE-LOCKED LOOP CONTROL

[75] Inventor: Brian G. Cleveland, Boulder, Colo.

[73] Assignee: Aspen Peripherals Corp., Longmont, Colo.

[21] Appl. No.: 242,031

[22] Filed: Sep. 8, 1988

[51] Int. Cl.[5] .............................................. G11B 5/05
[52] U.S. Cl. .................................................... 360/51
[58] Field of Search ..................... 360/51, 26; 375/108, 375/120, 119

[56] References Cited

U.S. PATENT DOCUMENTS

| | | | |
|---|---|---|---|
| 3,641,534 | 2/1972 | Irwin ....................................... | 360/51 |
| 3,806,822 | 4/1974 | Meyer et al. ........................ | 375/120 |
| 3,865,981 | 2/1975 | Welch et al. ........................... | 360/51 |
| 4,068,198 | 1/1978 | Otto ....................................... | 332/19 |
| 4,369,515 | 1/1983 | Valdes .................................. | 375/108 |
| 4,594,703 | 6/1986 | Tomisawa et al. .................... | 360/51 |
| 4,613,979 | 9/1986 | Kent ..................................... | 375/108 |
| 4,633,193 | 12/1986 | Scordo ................................. | 375/120 |
| 4,680,651 | 7/1987 | Blessinger ............................. | 360/51 |
| 4,737,866 | 4/1988 | Ebata ................................... | 375/120 |

Primary Examiner—Vincent P. Canney
Attorney, Agent, or Firm—Dorr, Carson, Sloan & Peterson

[57] ABSTRACT

An improved phase-locked loop control having DEAD TRACK acquisition wherein a separate oscillator generates a fixed frequency of digital pulses corresponding to the frequency of the data board in the storage media and, in the event of a DEAD TRACK in the storage media, the phase-locked loop control locks onto the fixed frequency output of the oscillator to insure lock during DEAD TRACK integral.

8 Claims, 4 Drawing Sheets

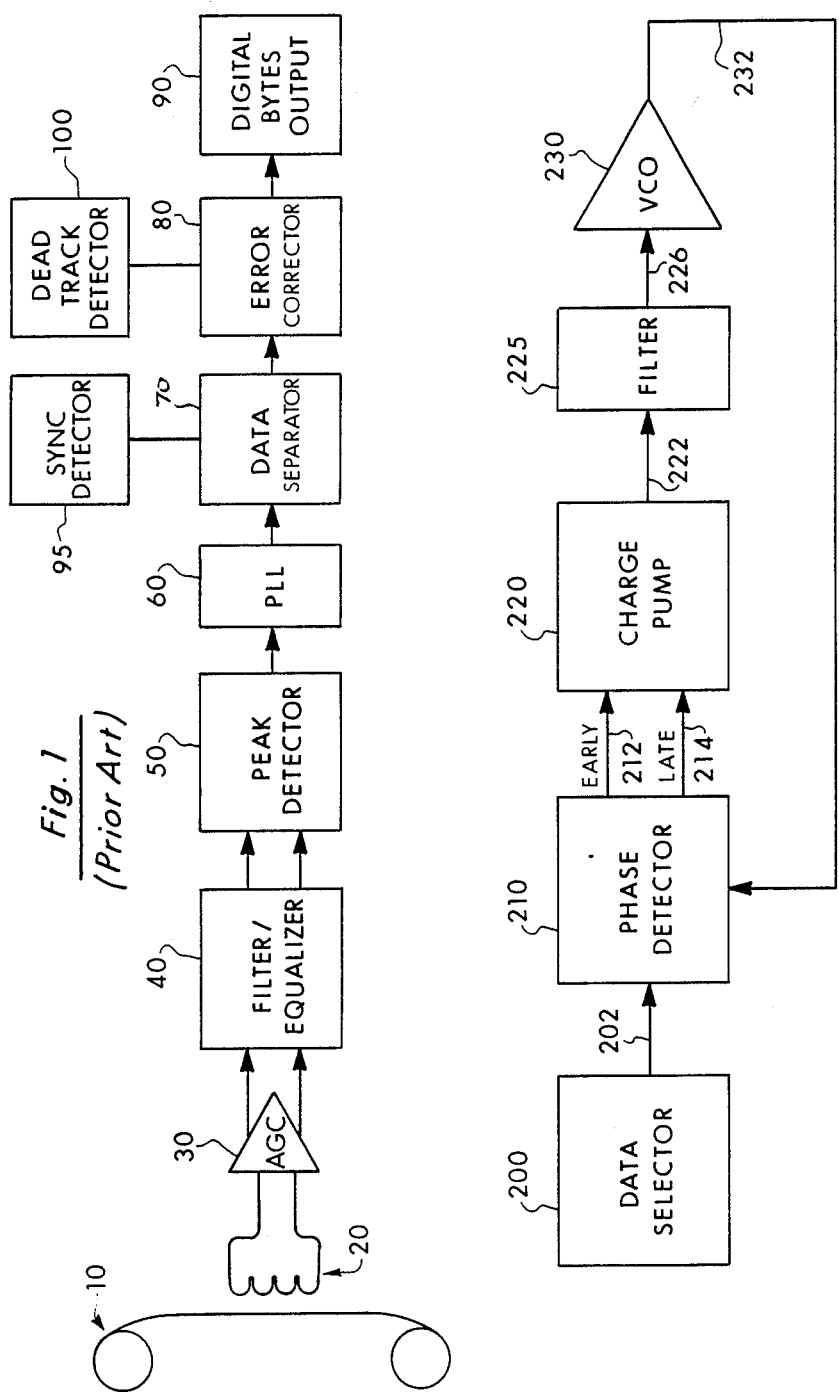

DEAD TRACK ACQUISITION FOR PHASE-LOCKED LOOP CONTROL

BACKGROUND OF THE INVENTION

1. Related Invention

This invention is related to "Improved Phase-Locked Loop Control for Reading Data Off Storage Media" by Brian G. Cleveland, Ser. No. 07/183,843, filed Apr. 20, 1988.

2. Field of the Invention

The field of this invention pertains to phase-locked loop controls for reading data from storage media and, in particular, to phase-locked loop controls having improved dead track acquisition during reading of data from high density media such as the IBM 3480 cartridge storage system.

3. Discussion of Prior Art

It is conventional in high performance disk, tape or optical products to employ a phase-locked loop (PLL) in the read channels. The phase-locked loop control functions to track speed variations of the incoming data read from the media to insure accurate reading of data.

An example of a conventional tape product that incorporates a phase-locked loop control is shown in FIG. 1. In FIG. 1, a storage media 10 such as the IBM 3480 cartridge is read by a tape head 20 which delivers output signals through an automatic gain control circuit (AGC) 30. The signals from the automatic gain control circuit 30 enter a filter and equalizer circuit 40 which filters the signal and provides equalization thereto. The signals are then delivered to a peak detector 50 which for every peak delivers a digital value representing a "digital one" that was previously written on the media. The peak detector delivers the signal to a conventional phase-locked loop circuit 60 which, as mentioned, tracks speed variations in the incoming data on storage media 10. The data from the phase-locked loop 60 is delivered to a conventional data separator 70 and error correction circuit 80 for delivery as digital bytes of data information 90 into the system. The dead track detector circuit 100 in cooperation with the error correction circuit 80 conventionally ascertains whether a data track in the media 10 has been in error for a certain length such as eight frames or more, and if so, ignores that track for a predetermined number of frames. In the IBM approach, every 72nd frame of a data block has RESYNC bytes (i.e., Frame 72) which do not form part of the customer's data.

Once a particular track has been designated "dead" by circuit 100, the error correction circuit 80 ignores the data read from that track and proceeds to correct it according to conventional error correction techniques. During this time, the phase-locked loop 60 still continues to lock to the "dead" track and, as the RESYNC frame approaches, the SYNC detector 95 looks for the unique RESYNC bytes (i.e., in the IBM system: 100010001). Upon detection of RESYNC, the track is returned to the normal mode (i.e., Not Dead) and tries to read the actual data. If the track is performing properly, the normal mode is maintained. If not, the track is again designated dead. This process repeats for each RESYNC frame in the customer's data. In FIG. 2, the conventional phase-locked loop circuit 60 is shown to include a data selector which obtains the incoming data from the peak detector 50. The data selector circuit 200 is conventional. The output of the data selector is delivered into the phase detector 210. Phase detector 210 compares the incoming signal on line 202 to the clock on line 232 and if there is any difference between the phase of the clock and the phase of the data on line 202, a charge pump 220 is selectively activated. For example, if the data pulse precedes the clock pulse, this is an early phase error and lead 212 becomes activated to cause the charge pump circuit 220 to deliver more current into the filter 225 which is converted to a voltage. This causes the voltage controlled oscillator (VCO) 230 to increase frequency in order to obtain a phase match. Likewise, if the data on lead 202 follows the clock pulse, a late signal is delivered over lead 214 to the charge pump 220 to cause the frequency of the voltage control oscillator 230 to slow down. In a predetermined number of clock cycles, the phase-locked loop circuit 60 is in synchronism with the data. An example of a prior phase-locked loop approach is found in U.S. Pat. No. 4,068,198.

Variations in the frequency of the signal on lead 202 can be due to a number of things including defects in the media 10 which could cause dropouts or missing pulses, speed variations, and tape flying irregularities. The voltage controlled oscillator 230 is typically a variable 1.95 MHz clock for the IBM 3480 environment.

In FIG. 3, the prior art data format for the IBM 3480 high density tape storage sub-system is set forth showing an interlock gap (IBG) 300 followed by a preamble field (PRE) 310 comprising nine to thirteen frames of all "ones." Following the preamble field 310 is a synchronization (SYNC) field 320 which normally is two frames and which precedes a variable length customer data block (DB) 330. Every 72nd frame 340 of the data block 330 has the RESYNC field as discussed above. Other special purpose frames are not shown.

The phase-locked loop 60 operates in a high gain mode (HGM) during the preamble frames 310. During this mode of operation, the phase detector 210 matches the phase for each "one" read in the preamble. In the high gain mode, the phase-locked loop control 60 synchronizes the oscillator 230 with the frequency of the incoming data generally within two to five frames. After seven frames of the preamble frames 300, the phase-locked loop 60 enters the low gain mode (LGM) which provides phase comparisons only on the edges of data "ones."

As mentioned, proper synchronization is not always successful. For example, defects in the magnetic media can obscure the data. Tape drives may also exhibit varying degrees of skew across the head so that the preamble is not aligning with all tracks simultaneously. Furthermore, the tape could flutter across the head and thereby obscure the data. During the inter block gap (IBG), the phase-locked loop control 60 is idle.

4. Statement of Problem

A problem arises with the prior approach of FIGS. 1 through 3 when defects such as corrupt data or frequency variations exist with the actual data on the track so that the PLL 60 loses lock and is unable to recover data from the rest of the data block 330. In such a case, the PLL will not regain lock until a new block of data is read and, therefore, the track will always be dead throughout the entire record length. When the PLL 60 loses lock it is unable to read the RESYNC frames. When this occurs, even though the track may be able to be properly read, with the PLL out of lock, the track will be wrongly termed "dead."

5. Solution

The present invention provides a solution to this problem to better insure the integrity of operation of the phase-locked loop control 60. An oscillator having a frequency fixed to the expected frequency of the storage media (i.e., 1.95 MHz for the IBM 3480 media) is used as an input to the PLL when a track has been designated "dead." The PLL 60 then locks onto this separate oscillator input and maintains lock during reading of the "dead" track. As the RESYNC frame is approached, the data selector is activated to read the track with the full assurance that the PLL is properly locked in.

SUMMARY OF THE INVENTION

The present invention improves the phase-locked loop control in a high density data storage media reading system by providing a separate oscillator which generates a fixed frequency corresponding to the frequency of the data stored on the media. In the event of a dead track in the storage media, the phase-locked loop control locks onto the output of the separate oscillator in order to maintain lock.

In particular adaptation to the IBM 3480 storage media, the phase-locked loop control receives the oscillator pulses during dead track conditions until the next RESYNC frame when the phase-locked loop control then locks to the RESYNC frame and the system attempts to read the actual data from the media. Upon proper reading of the RESYNC frame, the phase-locked loop control continues reading the data. Upon improper reading, the RESYNC frame, the control reverts back to reading the pulses from the oscillator in order to assure lock.

DESCRIPTION OF THE DRAWING

FIG. 1 is a prior art block diagram of a conventional IBM 3480 tape read channel;

FIG. 2 is a prior art block diagram of a conventional phase-locked loop control;

The present invention improves the data selector 200 and the phase detector 210 of the phase-locked loop control 60.

1. Improved Data Selector

Figure 8:
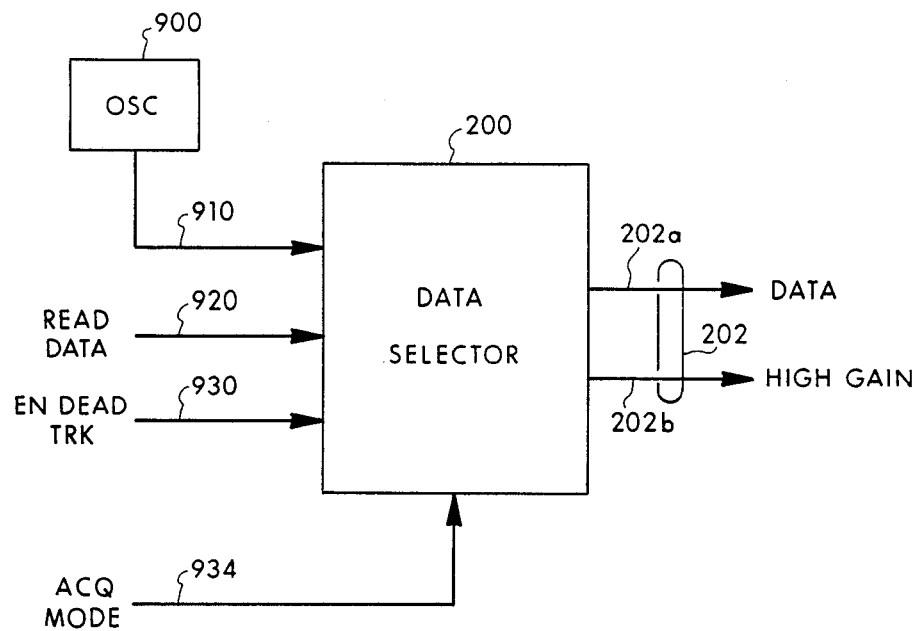
FIG. 8 is the block diagram schematic of the data selector of the present invention.

The improved data selector 200 of the phase-locked loop 60 is shown in FIG. 8. In FIG. 8, an oscillator 900 is added to the data selector circuit 200. The oscillator (900 in the preferred embodiment for an IBM 3480 system, the oscillator is 1.95 MHz) delivers its digital clock signals or pulses over line 910 to the data selector 200.

A "Dead Track" signal is delivered on lead 930. This signal is generated when, for a particular track, (1) a RESYNC frame is not properly read or (2) a predetermined number of frames in the track, (such as eight consecutive frames) have error corrections being made.

Under the teachings of the present invention, the phase-locked loop 60 when enabled by the "Dead Track" signal enters the High Gain Mode (HGM) and becomes locked to the fixed frequency of oscillator 900. This prevents the possibility of the PLL 60 "unlocking" from the track as may occur in prior approaches. Then, as the RESYNC frame 340 is approached (i.e., usually a predetermined number of frames, such as five frames prior to each RESYNC frame), the phase-locked loop 60 switches over to the Low Gain Mode (LGM) and locks onto the data on the track. The RESYNC data (10001001) is then read by the conventional sync detection circuit, not shown, which looks for the RESYNC character. If the RESYNC character is recovered correctly, reading of the track continues in its normal mode and, if incorrect, the dead track mode is returned to.

In FIG. 8, the read data on line 202a (DATA) becomes enabled (1) when the data actually read from the storage on line 920 is logically ANDed with the inversion of the enable dead track signal on line 930 (i.e., DATA * NOT DEAD TRK, where *=AND) or (2) when the signal on the dead track line 930 is ANDed with the oscillator output on line 910 (i.e., OSC * DEAD TRACK).

Hence, the PLL 60 locks to the signals on line 202a (1) which comprise the actual data read from storage when the track is proper (i.e., not dead) and (2) which comprise the oscillator pulses when the track is dead. Likewise, a "high gain" output on line 202b becomes logically enabled (1) whenever the acquisition mode (ACQ MODE) signal on line 940 is activated or (2) when the dead track signal is present on line 930. In the event of a dead track signal, the anticipator 410, under the teachings of the present invention, is forced to follow the oscillator pulses.

The data separator is implemented in a programmable array logic (PAL) device such as the type manufactured by Advanced Micro Devices, 901 Thompson Place, Sunnyvale, California 94086 as Model No. 22V10 PAL. The PAL is programmed to function according to the above logical relationships.

2. Improved Phase Detector

Figure 3:
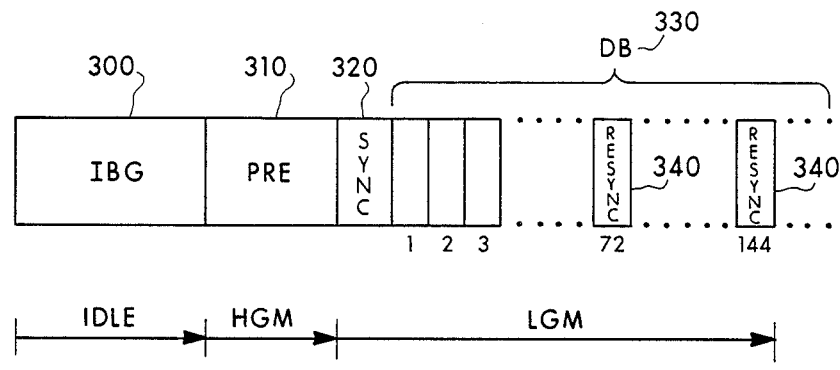
FIG. 3 is a prior art illustration showing the data format for an IBM 3480 high density tape storage subsystem.
Figure 5:
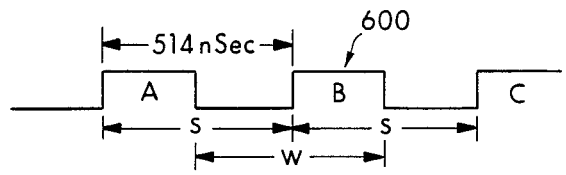
FIGS. 5-7 illustrate the operation of the pattern qualifier of the related invention.
Figure 4:
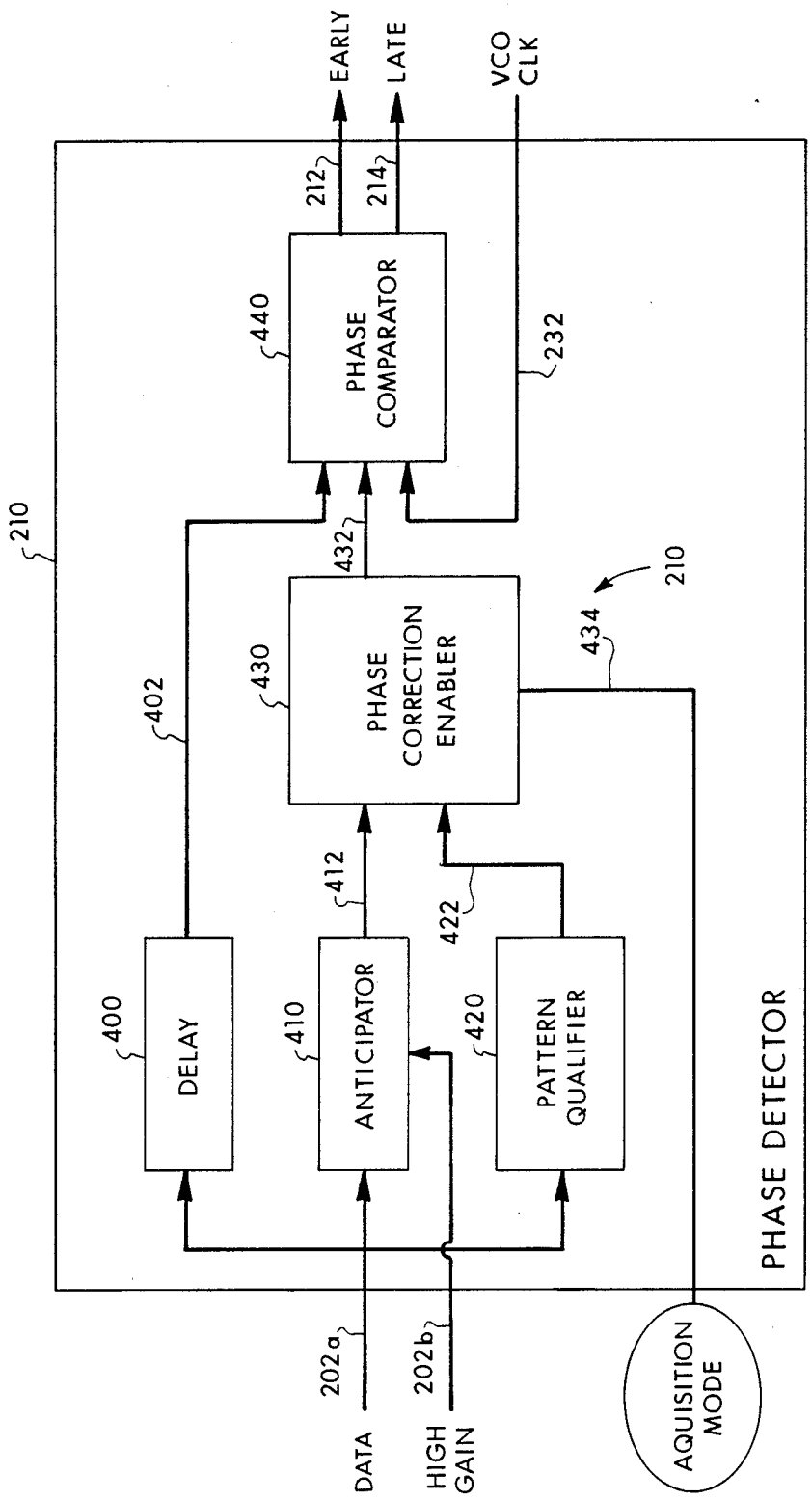
FIG. 4 is the block diagram of the phase-locked loop control of the present invention.

The improved phase detector 210 is shown in FIG. 4. The data which is read from the tape 10 appears on bus 202a which is delivered into a delay circuit 400, an anticipator circuit 410, and a pattern qualifier 420. The delay circuit 400 delays the data by one-half half of the normal data spacing or, in the preferred embodiment, by 257 nanoseconds. In FIG. 5, a normal 1.95 MHz series of "ones" is shown. At this frequency, the period, S, for a single cycle is 514 nanoseconds as shown in FIG. 5. The delay circuit 400 conventionally delays the data on bus 202 by the required time.

The anticipator circuit 410 is also conventional and functions, during the low gain mode, to activate the phase correction enabler 430 to enable over line 432 the phase comparator 440. Hence, in the presence of a data "one" at the input to the anticipator circuit 410, the lead 412 becomes activated to activate phase correction enabler 430 to enable lead 432 to cause the phase comparator 220 to compare the delayed pulse on line 402 with the VCO clock pulse on line 232. Hence, the anticipator circuit enables the comparison to take place and the delay circuit 400 delays the pulse sufficiently to allow comparison to occur. This is a conventional operation when the acquisition mode over lead 434 is in low gain mode.

Figure 6:
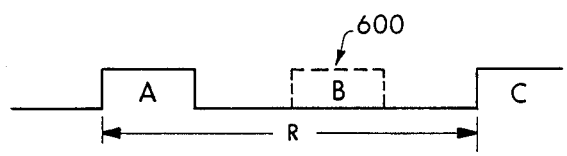
Figure 7:
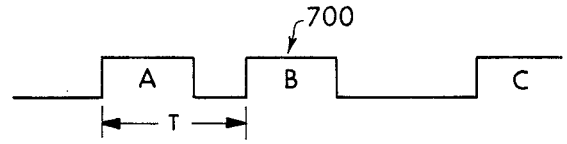

The related invention identified in the Background of the Invention section incorporates a pattern qualifier 420, for use during the high gain mode, in which to monitor for extra and missing preamble pulses. For example, in FIG. 6, preamble pulse 600 is missing. The pattern qualifier 420 functions as follows. In FIG. 5, pulse 600 is properly being delivered on bus 202a and the pattern qualifier 420 delivers a high signal on lead 422 which enables the phase correction enabler 430 to allow a phase comparison to occur. However, should the preamble pulse 600 be missing as shown in FIG. 6, then the signal on lead 422 is low and causes the phase correction enabler 430 not to deliver an enable signal on lead 432 thereby prohibiting the phase comparator 440 from functioning. In this manner, the phase comparator 440 only operates to synchronize with the data during the presence of properly spaced "ones" in the preamble. In the event of errors, as shown by the missing pulse in FIG. 6, the phase comparator 440 is deactivated maintaining the VCO frequency until the next "one" pulse is received. If the frequency of the VCO 230 were not maintained loss of lock would occur during these defects. The pattern qualifier 420 monitors the spacing between the bits when the acquisition mode over lead 434 is in the high gain mode. For example in FIG. 5, spacings S are monitored for bits A and B by the pattern qualifier. As shown in FIG. 6, if the spacing R is too long, the signal on lead 422 deactivates the phase correction enabler 430 from functioning. If R is greater than or equal to 1.5 S, then the pattern qualifier 420 deactivates the phase correction enabler 430. In FIG. 7, if the time "T" is too short, then the pattern qualifier 420 also disables the phase correction enabler 430. This is the case of an extra pulse being inserted into the preamble stream.

The phase correction enabler 430 is essentially a logic circuit that is enabled when the acquisition mode is high on line 434, when the pattern qualifier 420 properly detects patterns as discussed above, and the anticipator circuit 410 senses the presence of a "one" bit to produce a high when a data bit is present.

While preferred embodiments of the present invention have been shown, it is to be expressly understood that modifications and changes may be made thereto and that the present invention is set forth in the following claims.

I claim:

1. In a data storage subsystem having high density storage media, said high density storage media having a data block (330) with at least one data track, means (100) for issuing a DEAD TRACK signal when one of said at least one data tracks is defective, means (340) in said data block on said defective track for providing a plurality of resynchronization data frames (RESYNC), and a phase-locked loop control for locking onto the frequency of the data read from said storage media, said phase-locked loop control comprising:

means (800) for generating a fixed frequency of digital pulses, said fixed frequency corresponding to the frequency of data stored on said defective track, means (200) receptive (a) of said data from said storage media, (b) of said digital pulses from said generating means, and (c) of said DEAD TRACK signal from said issuing means for selectively outputting (1) said data in the absence of said DEAD TRACK signal between successive resynchronization frames and (2) said digital pulses in the presence of said DEAD TRACK signal, and means (210, 220, 225, 230) connected to the output of said outputting means for phase-locking onto said digital pulses for said defective track so as to maintain lock between said successive resynchronization frames and onto said data when said at least one data track is not defective.

2. The phase-locked loop control of claim 1 wherein said high density data storage subsystem is an IBM 3480 cartridge and wherein said fixed frequency is 1.95 MHz.

3. In a data storage subsystem having high density storage media, said high density storage media having a data block (330) with at least one data track, means (100) for issuing a DEAD TRACK signal when said at least one data track is defective, means (340) in a data block on said track for providing a plurality of resynchronization data frame (RESYNC), and a phase-locked loop control for locking onto the frequency of the data read from said storage media, said phase-locked loop control comprising:

means (800) for generating a fixed frequency of digital pulses, said fixed frequency corresponding to the frequency of data stored on said defective track, means (200) receptive (a) of said data from said storage media, (b) of said digital pulses from said generating means, and (c) of said DEAD TRACK signal from said issuing means for selectively outputting on a first output (1) said data in the absence of said DEAD TRACK signal and (2) said digital pulses in the presence of said DEAD TRACK signal and on a second output a high gain signal, means (210) connected to said first and second outputs of said outputting means for producing early and late phase signals based on said digital pulses for said defective track so as to maintain lock for said defective track between said successive resynchronization frame and based on said data when said at least one data track is not defective, and means (220, 225, 230) receptive of said early and late phase signals for phase-locking said phase-locked loop control based upon said early and late phase signals.

4. The phase-locked loop control of claim 3 wherein said high density data storage subsystem is an IBM 3480 cartridge and wherein said fixed frequency is 1.95 MHz.

5. In a data storage subsystem having high density storage media, said high density storage media having a data block (330) with at least one data track, means (100) for issuing a DEAD TRACK signal when said at least one data tracks is defective, means (340) in a data block on said track for providing a plurality of resynchronization data (RESYNC) frames, and a phase-locked loop control having variable frequency clock pulses (232) for locking onto the frequency of the data read from said storage media, said phase-locked loop control further comprising:

means (900) for generating a fixed frequency of digital pulses, said fixed frequency corresponding to the expected frequency of data stored on said defective track, means (200) receptive (a) of said data block from said storage media, (b) of said digital pulses from said generating means, and (c) of said DEAD TRACK signal from said issuing means for selectively outputting (a) said data in the absence of said DEAD TRACK signal and (b) said digital pulses in the presence of said DEAD TRACK signal, means (210) connected to said outputting means for producing early (212) and late (214) phase signals based on said digital pulses in said presence of said DEAD TRACK signal and based on the data in said data block in said absence of said DEAD TRACK signal, said producing means comprising:
(a) means (400) connected to said outputting means for delaying said data or said digital pulses a predetermined amount of time,
(b) means (410, 430, 440) connected to said delaying means for comparing the phase of said delayed data or of said delayed digital pulses from said delaying means to said clock pulses from said phase-locked loop control for said locking onto the frequency of said data or of said delayed;

means (220, 225, 230) receptive of said early and late phase signals for phase-locking said phase-locked loop control based upon said early and late phase signals to said delayed data or to said delayed digital pulses between successive resynchronization data frames.

6. The phase-locked loop control of claim 5 wherein said predetermined amount of time is one-half of said expected frequency of said data.

7. The phase-locked loop control of claim 5 wherein said expected frequency of said data is 1.95 MHz.

8. A method for improving the reading of data between successive resynchronization frames in a data block in the presence of a DEAD TRACK signal from a data storage subsystem, said data storage subsystem having a phase-locked loop control for locking onto the frequency of the data read from said data block, said method comprising the steps of:
(a) generating a fixed frequency of digital pulses, said fixed frequency corresponding to the expected frequency of said data in said storage block,
(b) in the presence of said DEAD TRACK signal, substituting said fixed frequency of digital pulses for said data being read from said storage block between reading the prior and the next resynchronization frames thereby maintaining the locking of said phase-locked loop control until the next resynchronization frame so that the effect of any defects that would cause the phase-locked loop control to lose lock is prevented,
(c) reading the next resynchronization frame,
(d) if unable to read said next resynchronization frame, and repeating steps (a), (b), (c), and (d), and
(e) if able to reach the next resynchronization frame, reading the data following therefrom.

* * * * *